(12) United States Patent
Gnepf

(10) Patent No.: US 10,648,808 B2
(45) Date of Patent: May 12, 2020

(54) OPTOELECTRONIC MEASURING DEVICE WITH MAGNETIC COMPASS AND COMPENSATION FUNCTIONALITY

(71) Applicant: Safran Vectronix AG, Herbrugg (CH)

(72) Inventor: Silvio Gnepf, Heerbrugg (CH)

(73) Assignee: Safran Vectronix AG, Heerbrugg (CH)

( * ) Notice: Subject to any disclaimer, the term of this patent is extended or adjusted under 35 U.S.C. 154(b) by 265 days.

(21) Appl. No.: 15/905,809

(22) Filed: Feb. 26, 2018

(65) Prior Publication Data

US 2018/0245918 A1 Aug. 30, 2018

(30) Foreign Application Priority Data

Feb. 28, 2017 (EP) ..................... 17158391

(51) Int. Cl.
*G01C 17/38* (2006.01)
*G01C 17/26* (2006.01)

(52) U.S. Cl.
CPC ............. *G01C 17/38* (2013.01); *G01C 17/26* (2013.01)

(58) Field of Classification Search
CPC .................................................. G01C 17/38
USPC ...................... 33/356; 702/92, 93
See application file for complete search history.

(56) References Cited

U.S. PATENT DOCUMENTS

| | | | |
|---|---|---|---|
| 4,949,089 A | 8/1990 | Ruszkowski, Jr. | |
| 6,009,629 A | 1/2000 | Gnepf et al. | |
| 6,286,221 B1* | 9/2001 | Voto | G01C 17/38 |
| | | | 33/356 |
| 6,401,047 B1 | 6/2002 | Voto | |
| 7,322,117 B2* | 1/2008 | Olson | G01C 17/38 |
| | | | 33/356 |
| 7,325,320 B2 | 2/2008 | Gnepf et al. | |
| 9,918,044 B2* | 3/2018 | Kirschner | G01C 17/38 |
| 10,502,560 B2* | 12/2019 | Annen | G01B 11/272 |

(Continued)

FOREIGN PATENT DOCUMENTS

EP 2645059 A1 10/2013
WO 2004/0099715 A2 11/2004

OTHER PUBLICATIONS

European Search Report and Written Opinion EP 17 15 8391 (dated Aug. 31, 2017).

*Primary Examiner* — Christopher W Fulton
(74) *Attorney, Agent, or Firm* — Alpine IP PLLC; David A. Jones

(57) ABSTRACT

Optoelectronic measuring device having an electronic magnetic compass and a compensation device assigned to the magnetic compass for compensating device-fixed interference fields and is designed to occupy at least two defined, repeatable operating states and generates a different device-fixed interference field in each of the operating states. The measuring device is designed to occupy at least two defined, repeatable application states, the magnetic compass being exposed to a different external magnetic interference field in each of the application states. The compensation device being designed to measure a first, second and third magnetic field set in a first, second and third overall state of the measuring device, and to determine by means of the processing unit a first, second and third set of parameters based on the first, second and third magnetic field set respectively, and to derive a fourth parameter set based on the first, second and third parameter set.

19 Claims, 8 Drawing Sheets

(56) References Cited

U.S. PATENT DOCUMENTS

2014/0107860 A1* 4/2014 Bugno ................. G01C 21/00
                                                                    701/1
2015/0012234 A1   1/2015 Annen et al.
2017/0010127 A1*  1/2017 Annen ................. G08B 29/14
2017/0343339 A1   11/2017 Annen et al.
2018/0299513 A1* 10/2018 Dusha ................. G01C 17/38

* cited by examiner

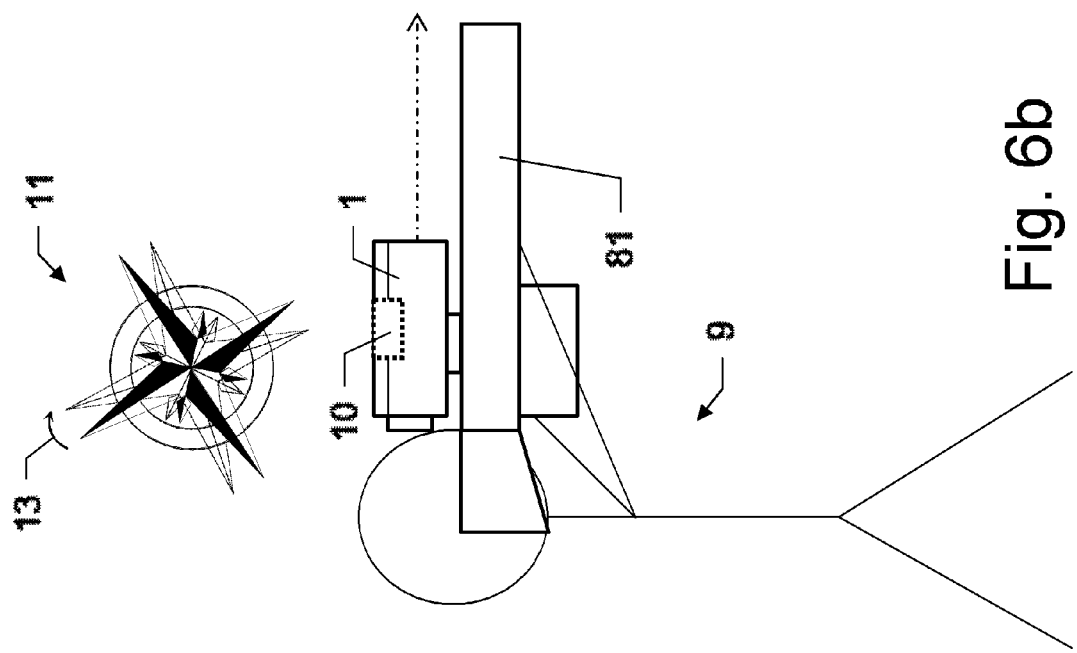
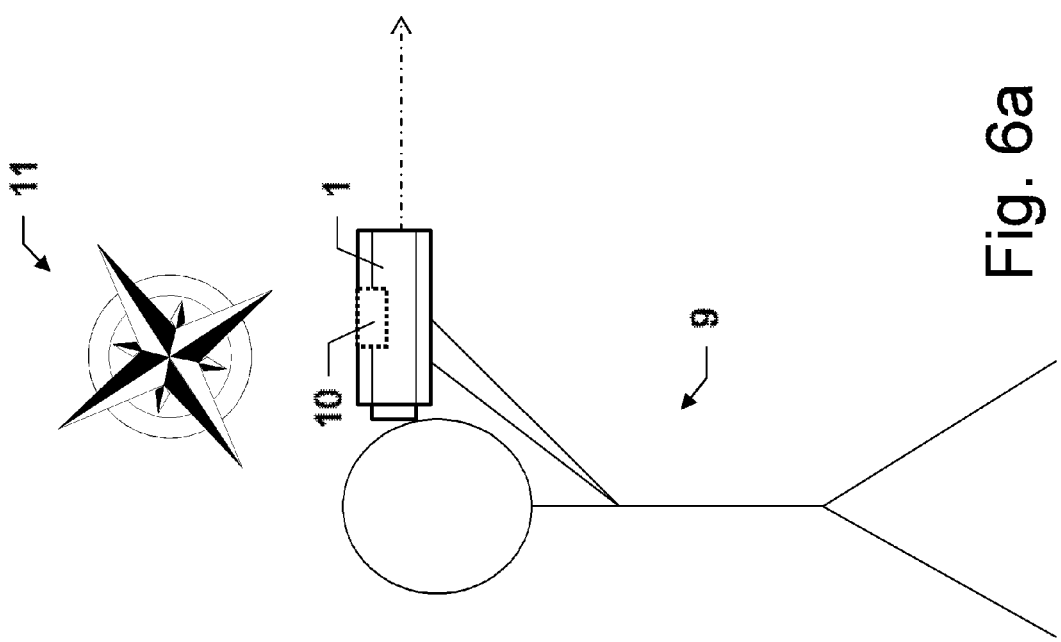

OPTOELECTRONIC MEASURING DEVICE WITH MAGNETIC COMPASS AND COMPENSATION FUNCTIONALITY

CROSS-REFERENCE TO RELATED APPLICATIONS

This application claims priority to EP 17158391.7 filed Feb. 28, 2017, the contents of which are hereby incorporated by reference herein for all purposes.

FIELD OF THE INVENTION

The invention relates to an optoelectronic measuring device, in particular an aiming device, having an electronic magnetic compass for determining the azimuthal orientation of the measuring device, as well as a method for determining an azimuthal orientation of such an optoelectronic measuring device. In particular, the invention relates to an automatic compensation of device-fixed hard and soft magnetic interference effects due to different operating states of the measuring device. In accordance with the invention, a fourth state is extrapolated from three magnetic states, in order to avoid an additional compensation procedure.

BACKGROUND

Such measurement devices are used, for example, for object recording and data collection for Geographic Information Systems (GIS), to determine coordinates of remote objects. Such measurement devices can also be designed as portable aiming devices, in particular for determining coordinates of military target objects, such as that described, for example, in U.S. Pat. No. 7,325,320 B2.

Such a determination of target coordinates requires the relative coordinates between the measuring device and the target object. For this purpose, the target device is aimed at the target object and the azimuthal and the zenithal alignment of the target device relative to earth are then determined. The angular values determined can then be provided, together with a typical accuracy value for each one, on a data interface of the aiming device for transmission to a firing control device. Using a firing unit, a firing action can then be applied by the firing control device into an area associated with the transmitted target coordinates.

In regard to the achievable accuracy of the target coordinates to be determined, the magnetic compass is the critical component. Due to the transmitted accuracy value of the azimuthal alignment, it is possible on the one hand to assess the effect of a firing action to be applied to the target object and on the other hand, the likelihood of collateral damage. In the case of a significant deviation between the actual and the specified typical accuracy value, this assessment can be wrong.

Even with an electronic magnetic compass it is still advisable to exercise great caution when determining actual azimuthal alignments, although the components of the magnetic and gravitational field as such are measurable with sufficient accuracy. It is also now possible, as disclosed in U.S. Pat. No. 4,949,089, to take into account the declination of the Earth's magnetic field from the geographic North almost automatically, using the "magnetic variation compensation" implemented in military GPS receivers. However, since in addition to the Earth's magnetic field, the carrier of the north direction information, the measured magnetic field usually comprises magnetic interference fields superimposed thereon, the azimuthal alignment relative to true geographic North can still often only be determined with a very limited accuracy and reliability, which can be a multiple of the pure device accuracy.

These magnetic interference fields comprise so-called stationary interference fields, associated with the measurement location, and device-fixed interference fields, which are attributable to electrical currents and both hard- and soft-magnetic materials of the device, in which the magnetic compass is installed.

From the prior art, a plurality of different methods are known, which make it possible to compensate for magnetic interference effects associated with magnetic compasses. As disclosed, for example, in DE 196 09 762 C1, device-fixed interference fields of a device having an electronic magnetic compass, which has sensors for the three-dimensional measurement of a magnetic and gravitational field, can be compensated for arithmetically using a vector equation when determining azimuthal alignments of the device. The parameters of the vector equation must first be determined by means of an optimization method. This optimization method is based on the values of a more or less rigidly defined sequence of measurements of the magnetic and gravitational field at a measurement site. In this case, the device is differently aligned in space during each of these measurements. In this way, however, stationary magnetic interference fields can neither be compensated nor detected at the measurement site.

A generic optoelectronic measuring device having a magnetic compass and a compensation functionality for this is described, for example, in US 2015/0012234 A1.

In order to at least reduce, or preferably eliminate entirely, magnetic interference effects, compensation is essential. Different compensation options exist for different sources of interference. If the magnetic characteristics of a device with a built-in magnetic compass change after compensation has already been applied, then a new compensation must necessarily be performed.

Often, however, the problem arises that the user does not perform the compensation that is actually necessary, thereby reducing the accuracy of the compass. The omission of the repeated compensation then results either from lack of time, from a lack of knowledge on the part of the particular user that a further compensation is necessary, or—since the procedure is often regarded as cumbersome—from convenience. In order to ensure the reliability of the measurements even under time pressure or with less experienced users, it would therefore be beneficial if the number of compensations to be performed could be reduced, and/or if after an initial compensation the user would not need to perform another compensation, simply because the magnetic state of the device was changed.

In the European patent application with the application number EP 16171143.7, a compensation functionality for a digital magnetic compass (DMC) of a generic optoelectronic measuring device having a plurality of hard-magnetic operating states is described. But if the measuring device is not, or not only, used in a hands-free manner, but is or can be mounted on another device instead, which also generates a device-fixed interference field or is even subject to soft-magnetic changes depending on its state, which influence the magnetic compass, the method described in EP 16171143.7 is only conditionally applicable.

If a user has such a measuring device that can be used in a plurality of different operating states, for example in one state for visual observation and one state for observation in infra-red light, and if the device is additionally to be used in two different ways independently of these operating states, that is to say, both hands-free and mounted on another device, then up to now the user has had to carry out a compensation for each relevant operating state and for each type of use and to save the parameters for later use. In the case of two operating states and two types of use, this means four compensations.

The other device may, in particular, also be a firearm. In this case, for example, due to loading or unloading or else repeatedly firing the weapon (temperature change, shock) magnetic changes can occur. The compensation would have to be repeated as often as necessary.

BRIEF SUMMARY

It is the object of the invention, therefore, to provide an improved optoelectronic measuring device having a magnetic compass, and an improved method for compensating a magnetic compass.

A further object of the invention is to provide such a measuring device and method with improved handling ability for a user, in which in particular an initial compensation of the magnetic compass can be performed more quickly and with less effort.

A further object of the invention is to provide such a measuring device and method with a lower susceptibility to errors.

A further object is to provide such a measuring device that can be designed lighter and smaller, in particular with regard to shielding of the magnetic compass from other components of the measuring device or against external devices, to which the measuring device is connected.

In particular, one object is to provide such a measuring device and method, in which after an initial compensation no further compensation needs to be carried out, if a known external magnetic interference occurs.

At least one of these objects is achieved according to the invention by an optoelectronic measuring device having the features set forth in the independent claims. Other alternative or advantageous designs or extensions of the invention are described in the dependent patent claims.

A first aspect of the present invention relates to an optoelectronic measuring device having an electronic magnetic compass for determining an azimuthal alignment of the measuring device and to a compensation device assigned to the magnetic compass for compensating device-fixed interference fields. The measuring device is designed to occupy at least two defined, repeatable operating states, and in each of the operating states has a different device-fixed interference field. The compensation device has a computing unit as well as a compensation functionality for performing an initial compensation of the electronic magnetic compass in a first and a second operating state of the measuring device. In addition, the measuring device is designed to occupy at least two defined, repeatable application states, wherein in each of the application states the magnetic compass is exposed to a different external magnetic interference field, and the compensation device is additionally designed to compensate for the external interference fields. According to the invention, the compensation device is designed, as part of the compensation functionality by means of the magnetic compass, to measure a first magnetic field set in a first overall state of the measuring device, in which the measuring device occupies the first operating state and a first application state, to measure a second magnetic field set in a second overall state of the measuring device, in which the measuring device occupies the second operating state and a first application state, to measure a third magnetic field set in a third overall state of the measuring device, in which the measuring device occupies the first operating state and a second application state, and using the computing unit, to determine a first, second and third set of parameters based on each of the first, second and third magnetic field set, and to derive a fourth parameter set based on the first, second and third parameter set.

The derived fourth parameter set corresponds, in particular, to a parameter set that can be determined based on a fourth magnetic field set, which is measurable in a fourth overall state of the measuring device, in which the measuring device occupies the second operating state and the second application state.

In accordance with one embodiment of the measuring device, it is a hand-held optoelectronic observation device. In particular, this can have a display unit for displaying measurement data, for example, the azimuthal orientation, and an interface for providing a signal that comprises information about the azimuthal orientation, for an external receiver, such as a Geographic Information System (GIS), a military firing control device or a hand-held data processing device.

According to a further embodiment, the magnetic compass of the measuring device has at least three sensors arranged in a device-fixed manner for measuring a magnetic field and the direction of the gravitational field.

According to a further embodiment, the compensation device has a memory unit for storing at least one magnetic offset, or offset of the parameter set, resulting from the different interference fields, in particular an offset between the first and one other overall state of the measuring device, wherein the computing unit is designed to calculate the azimuthal orientation of the measuring device as a function of a current state and based on the magnetic offset.

In one embodiment, the measuring device is designed to be mounted on an external device, which generates an external interference field, for example on a tripod or a weapon. In at least one of the at least two application states it is mounted on the external device, wherein the first and the second application state of the measuring device differ from each other in terms of the external interference field of the external device.

In particular, the measuring device can be designed to be mounted on different external devices, which generate different external interference fields, or mounted on an external device, which is designed to occupy at least two defined, repeatable states, wherein the external device generates a different external interference field in each of the states.

In another embodiment of the measuring device, the compensation device has a detection unit for detecting a current operational and/or application state of the measuring device. In particular, the detection device can be designed to automatically detect the current operational and/or application state.

To detect the operational state, for example, the activation/deactivation of an electrical system of the measuring device, or a positional change of a hard- or soft-magnetic component of the measuring device can be detected.

In one embodiment, the detection unit is designed to establish a data connection to the external device, to receive data about a current state of the external device using the data connection, and to determine the current application state of the measuring device based on the data about the current state of the external device.

In another embodiment, the first and the second operating state of the measuring device differ from each other at least with respect to a current state of a selectable electrical system of the measuring device, in particular in the fact that the electrical system of the measuring device is switched on or off, and the detection unit is designed to detect a current state of the electrical system.

In particular, the first and the second operating state can differ from each other in a current magnitude and/or voltage currently present in the electrical system, and the detection unit can be designed to determine a current magnitude and/or voltage currently present in the electrical system.

The selectable electrical system can be, for example, a night vision system or a display device, in particular having an LCD display, have a brightness control, or else be a GPS or a Bluetooth module.

According to a further embodiment, the measuring device has at least one hard- or soft-magnetic component, which is designed to occupy at least two different positions in or on the measuring device, the first and the second operating state differing from each other in that the hard- or soft-magnetic component has a different position.

The hard- or soft-magnetic component may be, in particular, a mechanical switch, such as a toggle, rotary or sliding switch to be operated by a user, or else a motorized movable unit, such as an optical zoom that is movable as part of a zoom operation.

According to a further embodiment, the compensation device is designed to instruct a user of the measuring device to perform the initial compensation as part of the compensation functionality, in particular by outputting operating action instructions on a display unit of the measuring device. The action instructions may include, in particular, instructions for changing the operating or application state, in other words, for example, instructions to switch an electrical system on or off, to move a hard- or soft-magnetic component into a different position, or to mount the measuring device on an external piece of equipment.

A second aspect of the present invention relates to a method for compensating a magnetic compass, wherein the magnetic compass is part of a device—in particular of an optoelectronic measuring device according to the first aspect—wherein the device is designed to occupy at least two defined, repeatable operating states, and has a different device-fixed magnetic interference field in each of the operating states.

The method comprises
 measuring a first magnetic field set using the magnetic compass under the influence of a first interference field of the device when in a first operating state,
 determining a first parameter set based on the first magnetic field set,
 measuring a second magnetic field set using the magnetic compass under the influence of a second interference field of the device when in a second operating state,
 determining a second parameter set based on the second magnetic field set,
 measuring a third magnetic field set using the magnetic compass under the influence of an external interference field and the first interference field of the device when in the first operating state,
 determining a third parameter set based on the third magnetic field set, and
 deriving a fourth parameter set based on the first, second and third parameter set.

The derived fourth parameter set corresponds to a parameter set, which can be determined based on a fourth magnetic field set, which is measurable under the influence of the external interference field and the second interference field of the device when in the second operating state.

In accordance with one embodiment of the method, the external magnetic interference field is caused by attaching the device to an external piece of equipment, or by a change of state on an external device on which the device is mounted, in particular wherein the external device generates the external magnetic interference field. The device and the external device are rigidly attached to each other, in particular fixed in relation to each other.

According to a further embodiment of the method, this comprises an automatic detection of the first and second operating state of the device, in particular having a detection of a current state of an electrical system of the device, and/or a current position of a hard- or soft-magnetic component of the device.

A further aspect of the present invention relates to a computer program product with program code, which is stored on a machine-readable medium, for executing at least the following steps of the method according to the second aspect, in particular when the program is executed on an electronic data processing unit designed as a compensation device of the measuring device according to the first aspect:
 determining the first parameter set based on the first magnetic field set,
 determining the second parameter set based on the second magnetic field set,
 determining the third parameter set based on the third magnetic field set, and
 deriving the fourth parameter set based on the first, second and third parameter set.

The invention also relates to a computer program product with program code, which is stored on a machine-readable medium, for executing the method according to the invention, in particular when the program is executed on an electronic data processing unit of the measuring device according to the invention that is designed as a compensation device.

BRIEF DESCRIPTION OF THE DRAWINGS

In the following, the invention is described in more detail by reference to figures. These show, in schematic representation:

FIG. 6*a-b* two examples of operating states of a measuring device according to the invention, each having a different external interference field;

DETAILED DESCRIPTION

Figure 1:
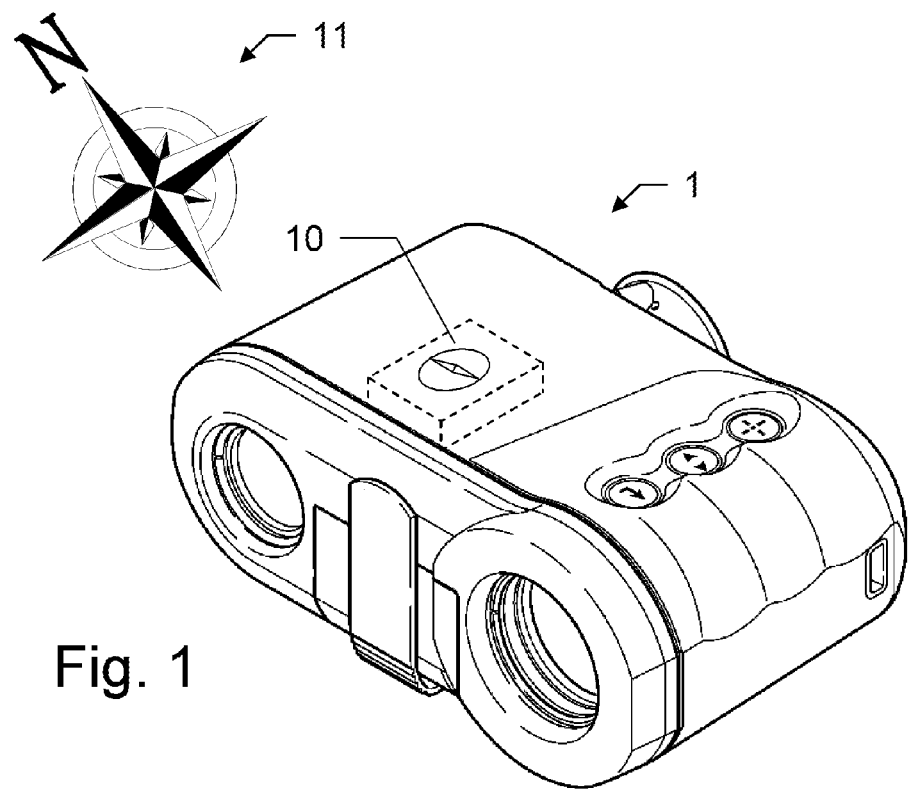
FIG. 1 an exemplary embodiment of a measuring device according to the invention having a magnetic compass.

FIG. 1 shows an example of an optoelectronic measuring device 1 according to the invention. The measuring device 1, shown here purely as an example, is configured as a hand-held observation device for monitoring a target object and for acquiring coordinates of the target object. To this end, among other things, it has a magnetic compass 10 for determining an azimuthal orientation of the measuring device 1 relative to the Earth's magnetic field 11. As a magnetic compass 10 for such a device according to the invention, for example, the DMC series from Vectronix can be used. The measuring device 1 also has a compensation functionality for performing a compensation of the magnetic compass 10 before acquiring coordinates.

Figure 2A:
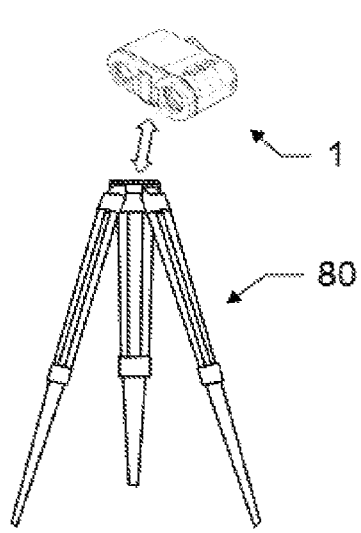
FIG. 2*a-b* the measuring device of FIG. 1, which can be mounted on different external devices, in this case, a tripod and a weapon.
Figure 2B:
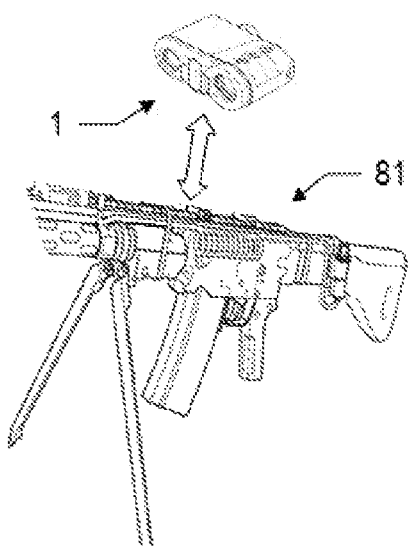

As illustrated in FIGS. 2*a* and 2*b*, in addition to the hand-held application the measuring device 1 can also be designed to be mounted on various external devices. Purely as examples, a tripod 80 and a weapon 81 are shown here. The external devices, especially if they have electrical components or modules made of hard- and/or soft-magnetic materials, generate an external magnetic interference field, which can influence the magnetic compass of the measuring device 1.

Figure 3:
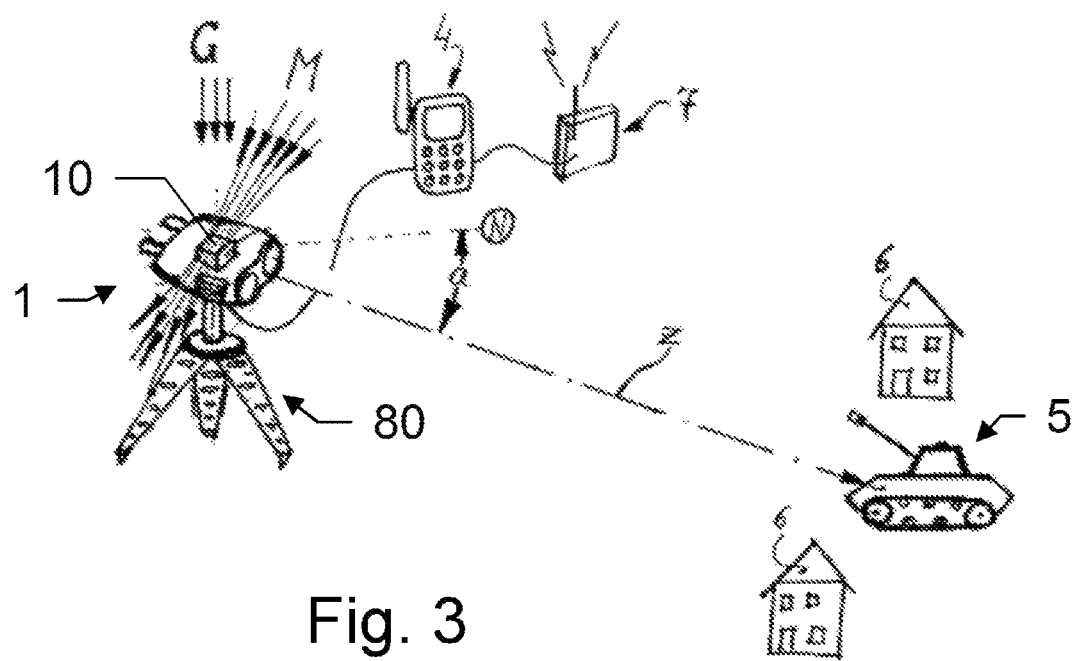
FIG. 3 an example of a measuring arrangement for determining target coordinates of a remote object having a measuring device with a magnetic compass on a tripod.

FIG. 3 shows an example of a measurement arrangement for determining target coordinates of a remote target object 5. The measuring arrangement has a measuring device 1, which is fixed to a tripod 80, a GPS receiver 4, and a transmission device 7. The target object 5 is here formed by a tracked vehicle, which has taken up a position next to a house 6. The components of GPS receiver 4 and transmission device 7, shown here as external devices, can alternatively be integrated into the measuring device 1.

In the measuring device 1, which here is designed as an observation device and has a binocular sight with a target axis Z, contains an integrated laser distance meter and a digital magnetic compass 10. In contrast to the actual laser distance meter, the digital magnetic compass 10 is indicated graphically as a small cube within the binoculars. Via the digital magnetic compass 10, which here has three device-fixed magnetic field sensors for the three-dimensional measurement of a magnetic field M and two inclination sensors for measuring the direction of the gravitational field G of the Earth, the azimuthal orientation a of the measuring device 1 relative to a calculated north direction N and its zenithal orientation relative to a perpendicular are determined.

In the calculated north direction N the declination—which is location-dependent on a regional scale—of the Earth's magnetic field relative to the geographic north direction is taken into account. In a known manner, this can be effected almost automatically by sending a specific declination value for the respective region from the GPS receiver 4 to the measuring device 1.

In a similar way to the consideration of the correct declination value, a correct compensation of device-fixed interference fields is a basic prerequisite for a correct determination of the azimuthal orientation, since device-fixed interference fields are located in the immediate vicinity of the magnetic compass 10 and therefore any changes in device-fixed interference fields that are not taken into account can cause considerable azimuth errors. Device-fixed interference fields are also taken into account in the calculated north direction N here.

Since in this measurement arrangement the device-fixed interference fields are correctly compensated and there are no fixed interference fields on a local scale in the vicinity of the measuring device 1, there is a substantially homogeneous magnetic field M, in which azimuthal orientations a can be correctly determined relative to each other without circular errors. This homogeneity is further increased by the mounting of the measuring device 1 on the tripod, since the magnetic compass 10 can only be moved within a very small measuring space of a few centimeters.

Stationary magnetic interference fields on a regional scale, which cause a constant azimuthal error, can be detected and roughly estimated to estimate the accuracy of azimuthal orientations a. In this method, with the digital magnetic compass 10 when determining an azimuthal orientation a, at least one field magnitude of the magnetic and gravitational field G and M, here the magnetic inclination, is provided at the same time. Because here the measurement location is known to the measuring device 1, for example via the GPS receiver 4, the measured magnetic inclination can be automatically assessed with the regionally location-dependent magnetic inclination of a model of the Earth's magnetic field—here the IGRF model—against a predetermined threshold value and an accuracy of azimuthal orientation a can be fixed.

If the difference between the magnetic inclination measured when determining the azimuthal orientation a and the magnetic inclination of the IGRF model compared to the threshold is significant, then a stationary magnetic interference field on a regional scale is present. In this case, the estimate of the accuracy of the azimuthal orientation a using the measuring device 1 must be adjusted accordingly.

If, on the other hand, the difference is insignificant in comparison to the threshold, then there should not be a significant, stationary magnetic interference field on a regional scale present. Since here there is also no stationary interference field present on a local scale in the vicinity of the measuring device 1 and the declination and the device-fixed interference fields are correctly taken into account, in accordance with a further method the accuracy of azimuthal orientations a can be fixed according to a compensation accuracy. This results from the arithmetic compensation of device-fixed interference fields and represents an upper limit for the achievable accuracy of azimuthal orientations a, if device-fixed interference fields are present and these are compensated when determining azimuthal orientations a. In the present measuring arrangement without fixed interference fields, the accuracy of azimuthal orientations a is determined to a good approximation by the compensation accuracy.

According to the disclosure of DE 196 09 762 C1, the arithmetic compensation of device-fixed interference fields is carried out using a vector equation, the parameters of which were determined by means of an optimization method. The optimization procedure is based on the values of a specified sequence of measurements of the magnetic and gravitational fields M and G, in which sequence the measuring device 1 is oriented differently in space at each location. The compensation accuracy is estimated using a statistical regression method, which is based on the values of the sequence of measurements taking into account the fixed parameters of the vector equation.

After the azimuthal orientation a of the measuring device 1 oriented to the target object 5 is determined, a signal is provided on an interface of the measuring device 1, which comprises, among other things, the specific azimuthal orientation a and its estimated accuracy. The signal provided is transmitted to the GPS receiver 4, where it is taken into account in the calculation of the target coordinates and their estimated accuracy and transmitted via the transmission device 7 to a firing control device (not shown here). Instead of a military firing control device, in particular in the case of civilian applications, the receiver can also be a Geographic Information System (GIS) or other data processing system or device, in particular a hand-held smartphone or tablet computer.

Based on methods for estimating the accuracy of the azimuthal orientation a implemented in the measuring device 1, the accuracy can be estimated relatively reliably. This allows possible collateral damage to the house 6 to be identified in a timely manner in the event of a planned firing action towards the target coordinates.

Electronic measuring devices 1 such as the monitoring device shown in FIG. 1 usually have a plurality of possible operating states. These operating states can lead to a greater or lesser perturbation of the magnetic field, resulting in a different indication of the azimuthal alignment by the magnetic compass. Possible causes for such magnetically variable states of a measuring device are illustrated in FIGS. 4a,b and 5.

Figure 4A:
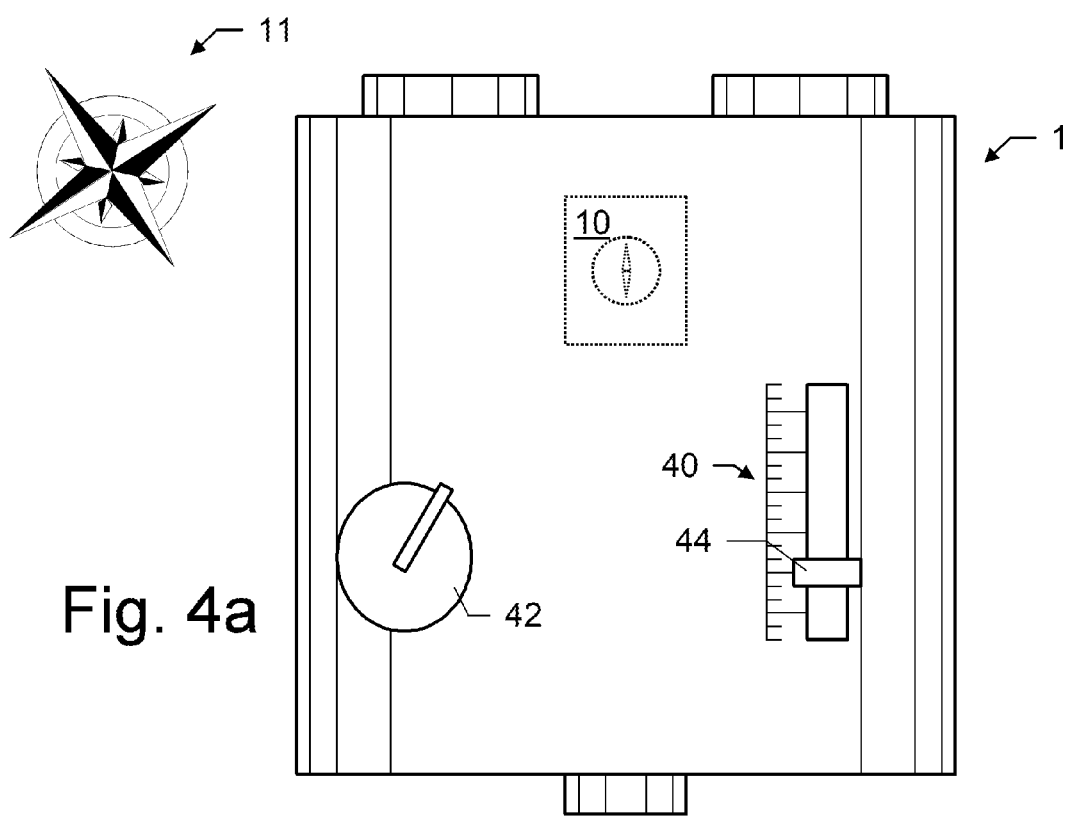
FIG. 4*a-b* two examples of operating states of a measuring device according to the invention, each having a different device-fixed interference field.
Figure 4B:
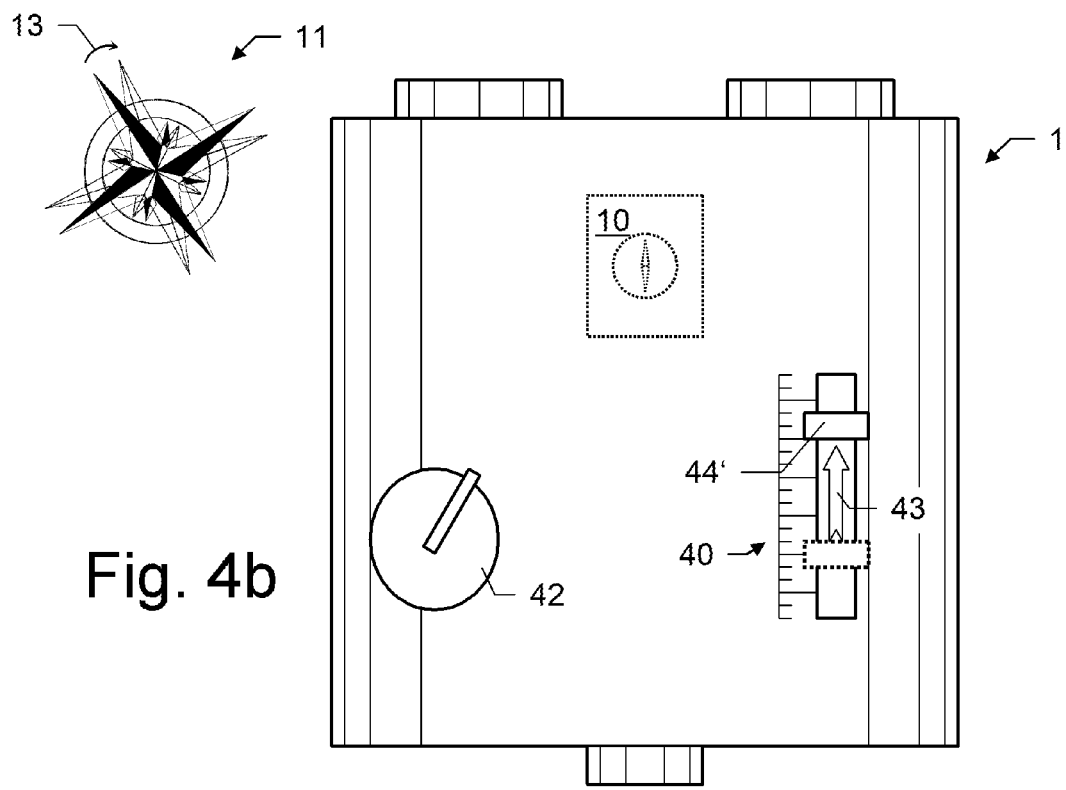

The FIGS. 4a and 4b show a monitoring device 1 in plan view. The magnetic compass 10 integrated inside the device is shown with dotted lines. On the monitoring device 1 examples of two switches 40, 42 are shown here, which are manually adjustable by a user of the device, and which wholly or partly consist of hard- or soft-magnetic materials: a sliding switch 40, for example, for the continuous adjustment of a zoom factor, and a rotary switch 42, for example for switching a night vision mode on and off. The two switches 40, 42 are shown in a first position in FIG. 4a.

If a compensation of the magnetic compass 10 is performed in this operating state of the device 1, i.e. with these positions of the two switches 40, 42, then a high-precision determination of the azimuthal orientation based on the magnetic field 11 is only possible in this operating state.

FIG. 4b illustrates a situation in which the sliding switch 40 of the first position 44 (see FIG. 4a) has been moved by means of a sliding movement 43 (in particular performed manually by a user) into a second position 44'. Due to the hard- and/or soft-magnetic properties of the switch 40, this produces a change in the device-fixed interference field. The magnetic field 11 is therefore determined using the magnetic compass 10 with a certain deviation, displacement or offset, and a soft-magnetic influence depending on the direction and strength of the Earth's magnetic field. This offset 13 describes the difference in the measured magnetic field between the device state during the initial compensation and the device state during the coordinate measurement.

Because of the resulting offset 13, in the prior art devices and methods a new compensation would then need to be performed, which would be time-consuming and therefore often annoying for the user. Due to the ignorance about the need for a re-compensation or the tedious nature of the process, the user often does not carry out a further compensation, which reduces the accuracy of the compass 10.

The device, therefore, preferably has a compensation device, which is designed to detect the operating state of the device and—depending on a first operating state during the compensation and a current operating state—to calculate a parameter offset value, or retrieve one from a data memory of the compensation device. This offset value is then taken into account in the determination of the actual azimuthal orientation of the device 1.

With reference to FIGS. 4a and 4b, this means that the positions of the two switches 40, 42 are first automatically recorded during the compensation. The positions are then recorded again, so that the change in position 43 and/or the new position 44' of the sliding switch 40 is detected. The resulting offset 13 is stored in a memory of the compensation unit are saved and can be retrieved from this as required, and used to determine the orientation. The recording of the positions may be performed both continuously and on an occasional basis. On an occasional basis means here, in particular, that the positions are always recorded at least at the time when a compensation or a measurement is carried out. Alternatively, a position change can also be monitored, wherein the device state is updated only when a change is detected, for example.

Figure 5:
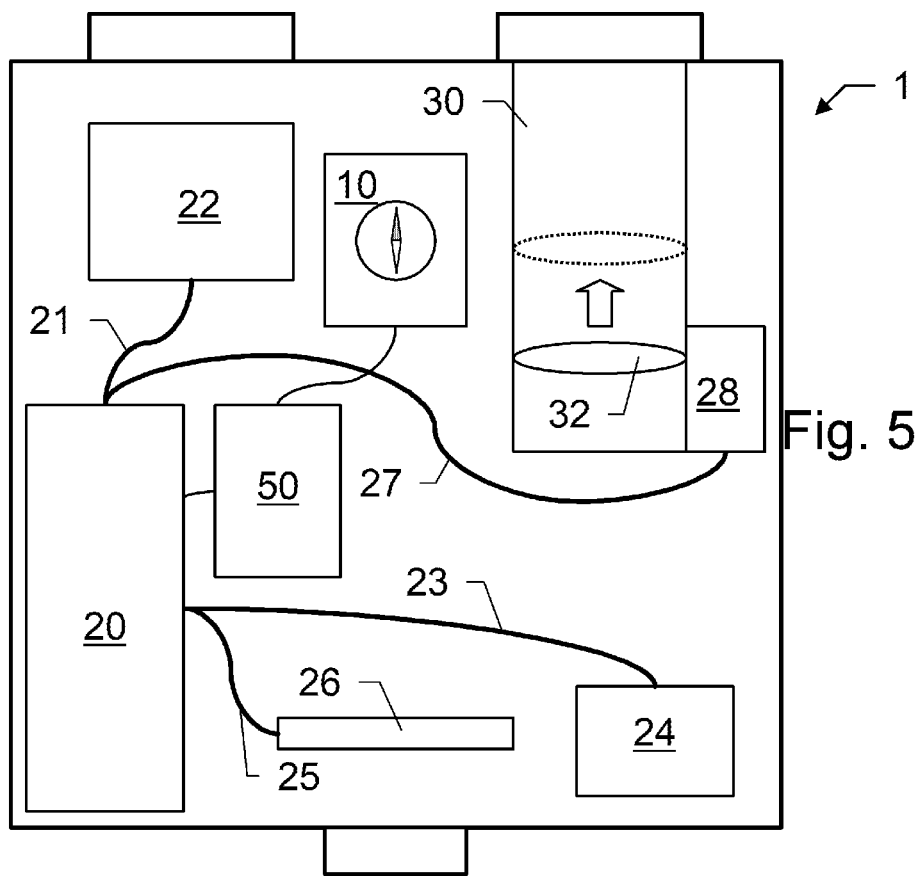
FIG. 5 an exemplary arrangement of electrical systems of a measuring device according to the invention adversely affecting the device-fixed interference field.

FIG. 5 shows the measuring device 1 in a schematic cross section, with examples of internal components. The internal components shown comprise firstly the magnetic compass 10 with a compensation device 50 assigned thereto and secondly, possible hard- or soft-magnetic interference sources, which can negatively affect the determination of a azimuthal alignment by the magnetic compass 1. Shown are a source of energy in the form of a battery 20 and as consumers, purely as an example, a night vision device 22, a GPS module 24, an LCD display 26, and a motor 28 for operating a zoom device 30. An electrical wire 21, 23, 25, 27 runs between the battery 25 and each of the consumers 22, 24, 26, 28.

Both the cables and the consumers, as selectable electrical systems, represent possible electrical interference sources 21-28 for the magnetic compass 10. If a compensation of the device 1 is carried out in a state in which the GPS module 24 and the LCD display 26 are switched on, i.e. appropriate currents flow through the electrical conductors 23, 25 to both consumers, these hard-magnetic interference sources will be compensated, so that the magnetic compass 10 functions reliably in this state of the device 1.

If, however, the night vision device 22 is then put into operation, additional currents flow through the conductor 21. This additional, non-compensated interference source causes an incorrect measurement of the magnetic compass 10.

In addition, the night vision function can cause an increased power consumption of the LCD display 26, which can result in the interference source of the current flow to this electrical system becoming greater.

In this embodiment also, the device has a compensation device 50, which is designed to detect the operating state of the device and, depending on a first operating state during the compensation and a current operating state, to calculate a magnetic offset value, or retrieve one from a memory. In this embodiment the compensation device 50 is designed to detect the state of the individual electrical systems. The interfering effect of each of these systems on the magnetic compass 10 in both the on and off state is known and preferably stored in a memory of the compensation device 50 at the factory.

With reference to the above example, this means that the compensation device 50 detects that during the compensation the GPS module 24 and the LCD 26 are switched on, and then with the night vision device 22 another device is put into operation, which adversely affects the magnetic compass 10 in the activated state. The difference in the adverse effects, i.e. here the additional impairment caused by the activated night vision device 22, is stored as an offset value in the memory of the compensation device 50 and is used to determine the current azimuthal orientation.

The zoom device 30 in this case has an adjustable optical element 32. This can also be partially hard- or soft-magnetic. Therefore, a position 32 of the optical element can preferably also be recorded by the compensation device and corresponding offset values are available in the memory for retrieval.

The "internal" operating states of the device, in which the magnetic compass is exposed to a different device-fixed magnetic field, are in this document distinguished from the "external" application states of the device, in which the magnetic compass is exposed to a different external magnetic field, which in particular can be generated by an external device, in the vicinity of which the compass is positioned.

FIGS. 6a and 6b illustrate in a first example two application states of an optoelectronic measuring device 1 that differ in terms of an external hard- and soft-magnetic interference field. In FIG. 6a the measuring device 1 is held in the hand by a user 9, while in FIG. 6b it is mounted on a hand firearm 81, which the user 9 is using together with the measuring device 1. In both cases the magnetic compass 10 of the device detects the magnetic field 11, wherein in the second case of FIG. 6b, as a result of a magnetic interference field caused by the weapon 81, an offset 13 occurs relative to the first case.

Figure 7B:
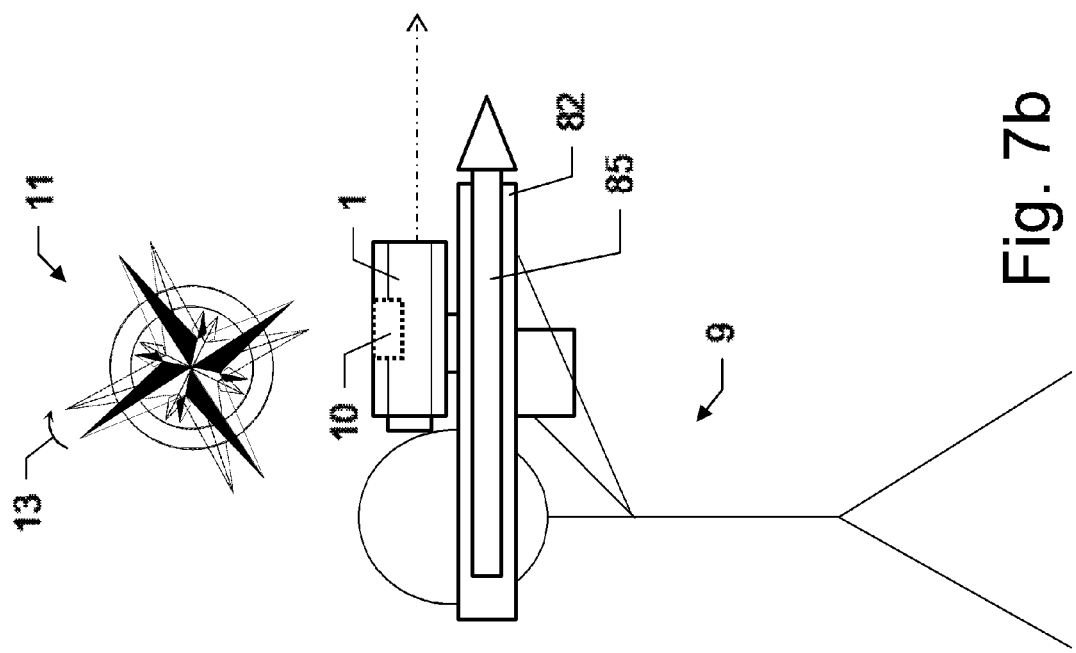
FIG. 7*a-b* two further examples of operating states of a measuring device according to the invention, each having a different external interference field.
Figure 7A:
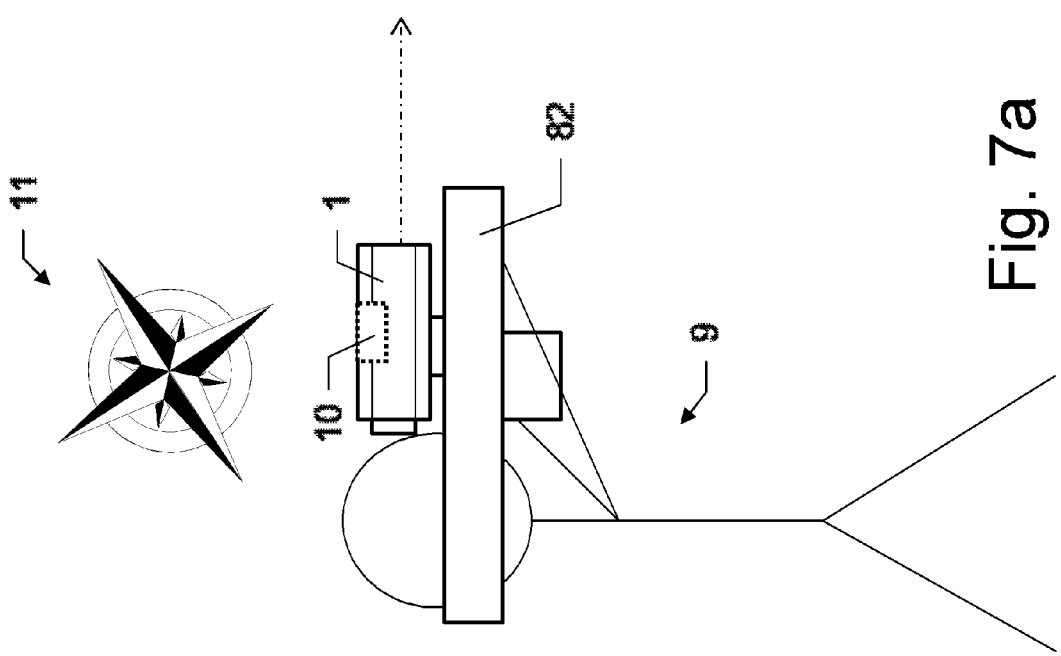

In FIGS. 7a and 7b this is illustrated by a second example. FIG. 7a shows a first application state of the measuring device 1, in which it is mounted on an anti-tank weapon 82, which here is used in a hand-held manner by the user 9. The anti-tank weapon 82, which is used to shoot down a guided missile or a grenade, for example, or can be designed as a bazooka, causes a first magnetic interference field in this state. FIG. 7b shows a second application state of the measuring device 1. Here it is still mounted on the same anti-tank weapon 82, but is now loaded. The missile 85 and the anti-tank weapon 82 together generate a different magnetic interference field than the anti-tank weapon 82 in FIG. 7a alone. Accordingly, the magnetic field measured by the compass 10 has an offset 13.

Other examples, not shown here, of a change in an external hard- and soft-magnetic interference field comprise, among other things, the mounting on a tripod or the use of a new battery.

Since the device-internal magnetic properties do not change, in the respective second (or other) application state it is sufficient to manually perform a compensation in only one operating state of the device. For a second operating state (or any number of other states), the values can be determined from the other compensations, as described below.

A method is described for the extrapolation of a parameter set to compensate for magnetic interference from three other known parameter sets, wherein a sensor arrangement for magnetic field measurement is mounted on a carrier, which can be a monitoring device, for example, and which contains both soft- and hard-magnetic materials that are located in various locations and/or different magnetization states, depending on the operating state of the use of said carrier. A first parameter set is determined in a first state, and another parameter set in a second state. In a third, an additional magnetic interference source is attached to said carrier, and in one of the previous two states a parameter set is determined. From the existing parameter sets, a suitable parameter set is then derived for the other state with the additional interference source.

This method can be carried out both under known ambient field strengths, i.e. for a physically correctly calibrated magnetometer on the carrier or for an uncalibrated magnetic field sensor arrangement on the carrier, as well as under unknown ambient field strengths, i.e. in the same environment for all measurements or in a different environment for each measurement.

The method applies to any number of internal states 1, 2, ..., N ("operating states"; cf. FIGS. 4a-b, 5) and external states a, b, c, ... ("application states"; cf. FIGS. 6a-b, 7a-b) of the measuring device. In the following, for the sake of simplification a "quadruplet" of states is always considered, i.e. two operating states. The usage without an additional interference thus occupies a special position, by assuming that their parameters remain stable over a fairly long period of time.

Fundamental Physical Model

The underlying mathematical perturbation model is described, for example, in EP 0 826 137 B1:

$$r = M \times b_E + o$$

where:
r: 3×1 vector of the magnetic data as measured by the sensors
M: 3×3 soft-magnetic matrix (which generally also includes the effects of sensor scale errors and non-orthogonalities)
$b_E$: 3×1 vector of the ambient magnetic field (Earth's magnetic field or additional geo-stationary interference fields)
o: 3×1 vector of the hard-magnetic interference fields (which generally also includes the effects of the sensor offset)

This equation can be inverted and solved for the Earth's magnetic field:

$$b_E = m \times (r - o)$$

where: $m = M^{-1}$

A hard/soft-magnetic compensation, such as in the DMC-SX implemented by the company Vectronix, determines M respectively m, and o.

Extended Magnetic Interference Models

We will consider in closer detail the composition of the soft-magnetic matrix M of the previous section and consider the effect that magnetic perturbations have on the physical fields:

$$b = b_E + D_1 \times b_E + \ldots + D_N \times b_E = D_{d1} + \ldots b_{dM} = (I + D_d) \times b_E + b_d = M_d \times b_E + b_d$$

where:
b: the entire physical field in physical units (e.g., T=Tesla, μT, nT, G=Gauss)
$b_E$: Earth's magnetic field in the same units
$D_k$: dispersion matrix of the soft-magnetic perturbing variable k $$D_d = D_1 + \ldots + D_N$$

$b_{dj}$: hard-magnetic vector of the perturbing variable j (advantageously setting j=k, M=N)

$$b_d = b_{d1} + \ldots + b_{dM}$$

This information can be used to filter out the actual Earth's magnetic field:

$$b_E = M_d^{-1}(b - b_d)$$

In a digital magnetic compass, such as for example the DMC-SX from the Vectronix company, the measurement of the magnetic fields is performed by magnetic field sensors. These can be described by their measuring directions, scale factors and offset errors:

$$r_k = f_k \times e_k^T b + o_k = m_k^T b + o_k, \quad k=x,y,z$$

wherein:
$r_k$: raw data value
$f_k$: scale factor (including gain factors, etc.)
$e_k$: 3×1 unit vector in the direction of the sensor measurement axis
$v^T$: transposed (1×3) vector
$m_k$: 3×1 vector, the combined effect of scale factor and direction ($=f_k \times e_k$)
$o_k$: sensor offset (zero error)
b: physical field at the location of the sensor This can be described with a sensor matrix $M_s$, and offset vector $o_s$, wherein for the ultimately measured sensor values r (raw data) as a whole, including the physical effects of the interferer, the following then applies:

$$r = M_s \times b + o_s = M_s \times (M_d \times b_E + b_d) + o_s$$

where:
r: 3×1 raw data vector
$M_s$: 3×3 matrix of the scale error and orthogonality deviations
$o_s$: 3×1 vector of the sensor offsets $$M_s = \begin{pmatrix} m_x^T \\ m_y^T \\ m_z^T \end{pmatrix}$$

$$O_s = \begin{pmatrix} O_x \\ O_y \\ O_z \end{pmatrix}$$

This is inverted to obtain the Earth's magnetic field in physical units:

$$b_E = (M_s \times M_d)^{-1} \times (r - o_d - o_s) = M^{-1} \times (r - o),$$

wherein the physical hard-magnetic vector for uniformity purposes was represented as $$b_d = M_d \times o_d \Rightarrow o_d = M_d^{-1} b_d.$$

In field compensations, which take place without further external resources, there is no possible means of specifying the geomagnetic field which can be determined by inversion of the physical-technical overall equation, in physical units, since the actual physical field strength of the ambient field is not known, and without further equipment (for example, a physically calibrated magnetic field measuring device) cannot in fact be determined. While given sufficient stability of the sensors the sensor matrix $M_s$ could indeed be determined at the factory, as a result of the device-internal soft-magnetic effects, however, objective field enlargements or field reductions (flux concentration, or flow dispersion) are produced, which must be assumed to be unknown.

In a practical field compensation for a magnetic compass such as the DMC-SX, which requires only directions and no objective field strengths, a uniform scaling of the specified field onto a fixed numerical value $f_D$ is performed:

$$b_{DE} = \frac{f_D}{|b_{EC}|} \times b_E,$$

so that $|b_{DE}|f_D$, for example, 4096 is displayed at the location of the compensation with the geomagnetic field (respectively, ambient field) $b_e = b_{EC}$ (in physical units) (in the DMC-SX the displayed field strength is normalized to 4096 units).

In total:

$$b_{DE} = \frac{f_D}{|b_{EC}|} \times (M_s \times M_d)^{-1} \times (r - o_d - o_s) = M^{-1} \times (r - o) = m \times (r - o)$$

and inverted:

$$r = \left(\frac{f_D}{|b_{EC}|}\right)^{-1} \times M_s \times M_d \times b_{DE} + o_s + o_d = M \times b_{DE} + o$$

where:
$b_{DE}$: 3×1 vector, Earth's magnetic field, as indicated by the interface of the DMC
$b_E$: 3×1 vector, Earth's magnetic field in physical units (e.g., T=Tesla, μT, nT, G=Gauss)

$$\frac{f_D}{|b_{EC}|}:$$

factor, so that the field vector displayed by the DMC has $f_D$ units (e.g. 4096)
$M_s$: 3×3 magnetic field sensor matrix
$M_d$: 3×3 matrix of the soft-magnetic effects $$M_d = I + D_1 + D_2 + \ldots D_N$$

I: 3×3 identity matrix
$D_k$: 3×3-matrix, which describes the dispersion of the Earth's magnetic field at the soft magnet K (k=1 ... N)
$o_s$ 3×1 vector of the sensor offset
$o_d$ 3×1 vector of equivalent sensor offsets corresponding to the sum of the hard-magnetic interference fields $$o_d = \left(\frac{f_D}{|b_{EC}|}\right)^{-1} \times M_s \times M_d \times b_d$$

In total, the combined matrices and vectors are obtained:

$$M = \left(\frac{f_D}{|b_{EC}|}\right)^{-1} \times M_s \times M_d$$

$$m = M^{-1} = \frac{f_D}{|b_{EC}|} \times (M_s \times M_d)^{-1}$$

$$o = o_s + o_d = o_s + M \times b_d$$

Magnetic Transformation

We assume that we can put a device fitted with a DMC into a plurality of possible states, which in general differ in both hard- and soft-magnetic ways.

$$Z = 1, 2, \ldots N_Z$$

In each of the states, the combined soft-magnetic matrices and hard-magnetic offsets described above are determined.

Another hard- and soft-magnetic interferer is then fitted to the device, or otherwise brought into a geometrically stable relationship, resulting in a combined state ZM:

$$ZM = 1M, 2M, \ldots N_Z M$$

Objective: The device is soft/hard magnetically compensated in only one of the states ZM. All other Z'M are extrapolated from the parameters of the previous states Z, Z' and the state ZM.

Extrapolation of the Physical Interferers

Assume the physical dispersion matrices are elicited by magnetic compensation methods using physically objective measurements (for example, using a calibrated magnetometer in the device and at the location of the compensation to determine the objective geomagnetic field strength), each in one state Z and Z'. Then the following apply:

$$b_E = M_Z^{-1}(b - b_{dZ}) \quad b_E = M_{Z'}^{-1}(b - b_{dZ'})$$

where:

$$M_Z = I + D_Z \quad M_{Z'} = I + D_{Z'}$$

If a further interferer M is added to the state Z of the device, and physically compensated, then the following is true:

$$b_E = M_{ZM}^{-1}(b - b_{dZM})$$

where:
b: physical total field (geomagnetic field and interferer)
$b_E$: physical geomagnetic field $$M_{ZM} = I + D_{ZM} = I + D_Z + D_M \text{ total soft magnetic matrix}$$

$$b_{dZM} = b_{dZ} + b_{dM} \text{ total hard-magnetic vector}$$

It is now desired to determine the overall magnetic state of another device state Z' with interferer M, without further compensation performed by the user. The following is true:

$$b_E = M_{Z'M}^{-1}(b - b_{dZ'M})$$

where:

$$M_{Z'M} = I + D_{Z'} + D_M \text{ total soft magnetic matrix}$$

$$b_{dZ'M} = b_{dZ'} + b_{dM} \text{ total hard-magnetic vector}$$

But from this, it follows that:

$$M_{Z'M} = I + D_{Z'} + D_M = I + D_Z + D_M + (D_{Z'} - D_Z) = M_{ZM} + (M_{Z'} - M_Z)$$

$$b_{dZ'M} = b_{dZ'} + b_{dM} = b_{dZ} + b_{dM} + (b_{dZ'} - b_{dZ}) = b_{dZM} + (b_{dZ'} - b_{dZ})$$

Therefore, the variables sought are related to ones that are already known, as desired.

Extrapolation with Device Raw Data

As described above, the raw data r measured in the device additionally include the effect of the magnetic field sensor errors, including subsequent amplification and digitization, described by the sensor matrix $M_s$ and sensor offsets $o_s$:

$$r = M_s \times b + o_s = M_s \times (M_d \times b_E + b_d) + o_s$$

Assume that the sensor matrix $M_s$ and sensor offsets $o_s$ are known, stable and stored separately, for example by a factory measurement followed by storage in the DMC itself. Therefore, a calibrated magnetic field measuring device is de facto created again.

In addition, as described in the previous section, assume there is an objective physical measurement of the ambient magnetic field at the location of the compensation available.

In a first step we calculate the objective physical field in the device from the raw data:

$$b = M_s^{-1}(r - o_s)$$

With this field we can proceed as described above. The overall effect is then given by $$b_E = M_{Z'M}^{-1}(b - b_{Z'M}) = M_{Z'M}^{-1}(M_s^{-1}(r - o_s) - b_{dZ'M}) = M^{-1}(r - o)$$

where:

$$M = M_s \times M_{Z'M}$$

$$o = o_s + M_s \times b_{dZ'M}$$

and the variables $M_{Z'M}$ and $b_{Z'M}$ are as previously described.

$$M_{Z'M} = M_{ZM} + (M_{Z'} - M_Z)$$

$$b_{Z'M} = b_{ZM} + (b_{Z'} - b_Z)$$

Extrapolation with Location-Dependent Scaling

As described above, we assume that no measurement of the magnetic fields of the compensation site in absolute physical units is possible, which means an arbitrary scaling of the indicated Earth's magnetic field must be made, to a specified value $f_D$, e.g. 4096.

In this case, it does not matter whether the sensor matrix $M_S$ and sensor offsets $O_S$ are known from a factory calibration. We therefore assume that the Matrix $M_S$ in fact remains stable between the compensations Z, Z' and ZM, but is not necessarily known. For the sensor offsets, nothing needs to be assumed.

As derived above, the compensations can then be described mathematically as follows:

$$b_{DE} = \frac{f_D}{|b_{EC}|} \times (M_s \times M_d)^{-1} \times (r - o_d - o_s) = M^{-1} \times (r - o)$$

Situation with Equal Ambient Field Strengths

As in the previous sections, we assume that full hard- and soft-magnetic compensations Z and Z' are available for the device without additional interferer(s), plus a compensation ZM for the device plus additional interferer(s). We seek the extrapolation of these results to the case Z'M.

If all compensations are made at the same location, we thus obtain (in the best case, with insignificant temporal change in the local ambient field) the same scaling factor. The following is then true:

$$M_Z = \frac{|b_{EC}|}{f_D} \times M_s \times M_{dZ} = \frac{|b_{EC}|}{f_D} \times M_s \times (I + D_Z)$$

$$o_Z = o_{dZ} + o_s = M_s \times b_{dZ} + o_s$$

$$M_{Z'} = \frac{|b_{EC}|}{f_D} \times M_s \times M_{dZ'} = \frac{|b_{EC}|}{f_D} \times M_s \times (I + D_{Z'})$$

$$o_{Z'} = o_{dZ'} + o_s = M_s \times b_{dZ'} + o_s$$

$$M_{ZM} = \frac{|b_{EC}|}{f_D} \times M_s \times M_{dZM} = \frac{|b_{EC}|}{f_D} \times M_s \times (I + D_Z + D_M)$$

$$o_{ZM} = o_{dZM} + o_s = M_s \times (b_{dZ} + b_{dM}) + o_s$$

And we seek:

$$M_{Z'M} = \frac{|b_{EC}|}{f_D} \times M_s \times M_{dZ'M} = \frac{|b_{EC}|}{f_D} \times M_s \times (I + D_{Z'} + D_M)$$

$$o_{Z'M} = o_{dZ'M} + o_s = M_s \times (b_{dZ'} + b_{dM}) + o_s$$

But this results in:

$$M_{Z'M} = \frac{|b_{EC}|}{f_D} \times M_s \times (I + D_{Z'} + D_{ZM})$$
$$= \frac{|b_{EC}|}{f_D} \times M_s \times (I + D_Z + D_{ZM} + (D_{Z'} - D_Z))$$
$$= M_{ZM} + (M_{Z'} - M_Z)$$

and $$o_{Z'M} = M_s \times (b_{dZ'} + b_{dM}) + o_s$$
$$= M_s \times (b_{dZ} + d_{dM} + (b_{dZ'} - b_{dZ})) + o_s$$
$$= o_{ZM} + (o_{Z'} - o_Z),$$

which solves the given problem.

Situation with Different Ambient Field Strengths

We again assume that full hard- and soft-magnetic compensations Z and Z' are available for the device without additional interferer(s), plus a compensation ZM for the device with additional interferer(s). We seek the extrapolation of these results to the case Z'M.

Unlike in the previous section though, all compensations are performed at different locations or in different ambient fields, so that we obtain different compensation factors. This should be by far the most common case. It then follows, introducing the additional definition $$f_k = \frac{|b_{EC}|}{f_D}$$
$$k = Z, Z', ZM, ZM'$$

for soft-magnetic total matrices and hard-magnetic offsets:

$$M_Z = f_Z \times M_s \times M_{dZ} = f_Z \times M_s \times (I + D_Z) \; o_Z = o_{dZ} + o_s = M_s \times b_{dZ} + o_s$$

$$M_{Z'} = f_{Z'} \times M_s \times M_{dZ'} = f_Z \times M_s \times (I + D_{Z'}) \; o_{Z'} = o_{dZ'} + o_s = M_s \times b_{dZ'} + o_s$$

$$M_{ZM} = f_{ZM} \times M_s \times M_{dZM} = f_{ZM} \times M_s \times (I + D_{ZM}) \; o_{ZM} = o_{dZM} + o_s = M_s \times b_{dZM} + o_s$$

And we seek:

$$M_{Z'M} = f_{Z'M} \times M_s \times M_{dZ'M} = f_{Z'M} \times M_s \times (I + D_{Z'M})$$
$$o_{Z'M} = o_{dZ'M} + o_s = M_s \times b_{dZ'M} + o_s$$

As before, for the hard-magnetic total offsets we indeed obtain:

$$o_{Z'M} = M_s \times b_{dZ'} + b_{dZM} + o_s = M_s \times b_{dZ} + b_{dM} + (b_{dZ'} - b_{dZ}) + o_s = o_{ZM} + (o_{Z'} - o_Z)$$

But the simple addition and subtraction of the soft-magnetic total actual matrices shown above is no longer possible:

$$M_{Z'M} = f_{Z'M} \times M_s \times (I + D_{Z'} + D_{ZM}) = f_{Z'M} \times M_s \times (I + D_Z + D_{ZM} + (D_{Z'} - D_Z))$$

but this is no longer the same as:

$$M_{ZM} + (M_{Z'} - M_Z) =$$
$$f_{ZM} \times M_s \times (I + D_Z + D_M) + f_{Z'} \times M_s \times (I + D_{Z'}) - f_Z \times M_s \times (I + D_Z) =$$
$$f_{ZM} \times M_s \times \left(I + D_Z + D_M + \left(\frac{f_{Z'}}{f_{ZM}} - \frac{f_Z}{f_{ZM}}\right) \times I + \frac{f_{Z'}}{f_{ZM}} \times D_{Z'} - \frac{f_Z}{f_{ZM}} \times D_Z\right) = f_{ZM} \times M_s \times \left(I + D_Z + D_M + (D_{Z'} - D_Z) + \left(\frac{f_{Z'}}{f_{ZM}} - \frac{f_Z}{f_{ZM}}\right) \times I + \left(\frac{f_{Z'}}{f_{ZM}} - 1\right) \times D_{Z'} - \left(\frac{f_Z}{f_{ZM}} - 1\right) \times D_Z\right) =$$
$$f_{ZM} \times M_s \times \left(I + D_Z + D_M + (D_{Z'} - D_Z) + \left(\frac{f_{Z'}}{f_{ZM}} - \frac{f_Z}{f_{ZM}}\right) \times I + \left(\frac{f_{Z'}}{f_{ZM}} - 1\right) \times D_{Z'} - \left(\frac{f_Z}{f_{ZM}} - 1\right) \times D_Z\right) =$$
$$f_{ZM} \times M_s \times \left(I + D_{Z'} + D_M + \left(\frac{f_{Z'}}{f_{ZM}} - \frac{f_Z}{f_{ZM}}\right) \times I + \left(\frac{f_{Z'}}{f_{ZM}} - 1\right) \times D_{Z'} - \left(\frac{f_Z}{f_{ZM}} - 1\right) \times D_Z\right) =$$
$$\left(\frac{f_{Z'}}{f_{ZM}} - \frac{f_Z}{f_{ZM}}\right) \times \left(M_{Z'M} + f_{Z'M} \times M_s \times \left(\frac{f_{Z'}}{f_{ZM}} - \frac{f_Z}{f_{ZM}}\right) \times I + f_{Z'M} \times M_s \times \left(\left(\frac{f_{Z'}}{f_{ZM}} - 1\right) \times D_{Z'} - \left(\frac{f_Z}{f_{ZM}} - 1\right) \times D_Z\right)\right)$$

We therefore obtain additional, incorrect soft-magnetic components.

A general solution is not possible; however, an approximation can be used. Typically, the soft magnetic effects are relatively small, in the region of 1E-2 of the Earth's magnetic field.

From the matrix calculus the following series development is known, by analogy to the well-known Taylor series of the corresponding scalar formula:

$$(I+D)^{-1} = I - D + D^2 - D^3 \pm \ldots \approx I - D,$$

wherein the terms for elements of D in the range of 1E-2, the terms $D^n$ are similarly on the order of magnitude 1E-2×n, so that after ignoring terms the error for the specified linear approximation is in the region of 1E-4.

But from this we obtain:

$$M = M_{ZM} \times M_Z^{-1} \times M_{Z'}$$
$$= f_{ZM} \times M_s \times (I + D_Z + D_M) \times (f_Z \times M_s \times (I + D_Z))^{-1} \times f_{Z'} \times M_s \times (I + D_{Z'})$$
$$= \frac{f_{Z'}}{f_Z} \times f_{ZM} \times M_s \times (I + D_Z + D_M) \times (I + D_Z)^{-1} \times (I + D_{Z'})$$
$$\approx \frac{f_{Z'}}{f_Z} \times f_{ZM} \times M_s \times (I + D_Z + D_M) \times (I - D_Z) \times (I + D_{Z'})$$
$$\approx \frac{f_{Z'}}{f_Z} \times f_{ZM} \times M_s \times (I + D_Z + D_M - D_Z + D_{Z'})$$
$$= \frac{f_{Z'}}{f_Z} \times f_{ZM} \times M_s \times (I + D_{Z'} + D_M)$$
$$= \frac{f_{Z'}}{f_Z} \times M_{Z'M}$$

The additional factor $f_{z'}/f_z$ is insignificant for use in direction-finding. Provided the Z, Z' measurements took place at the same location (for example as part of a factory calibration), it is equal to one.

Figure 8:
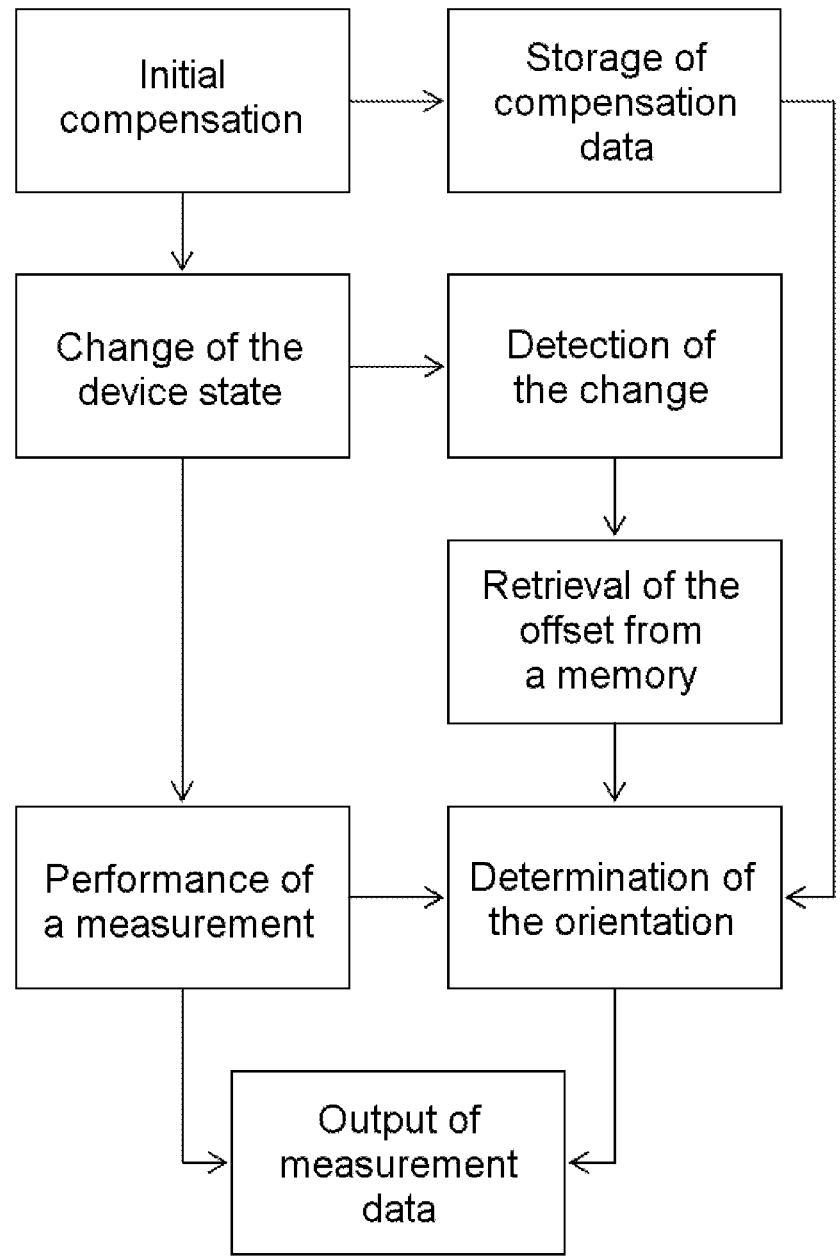
FIG. 8 a flow chart illustrating an exemplary method for determining an azimuthal orientation.

FIG. 8 shows a flow chart illustrating an exemplary method for determining an azimuthal orientation. This begins with an initial compensation of the magnetic compass at the location of the measurement. Corresponding compensation data are stored. If the operating state is now modified so that the device-fixed interference field is changed, this is detected by the device (e.g. automatically or by user input). Depending on the change, a corresponding offset value, which represents the change in the device-fixed interference field and is stored, for example, at the factory in a memory of the device, is retrieved from this memory as soon as the actual measurement is made. Taking into account the original compensation data and the offset the orientation can then be determined, without an additional compensation needing to be made. The orientation is used in the calculation of the measurement data that are displayed to the user. This method does not take into account, however, that the device can also occupy different application states with different external interference fields.

Figure 9A:
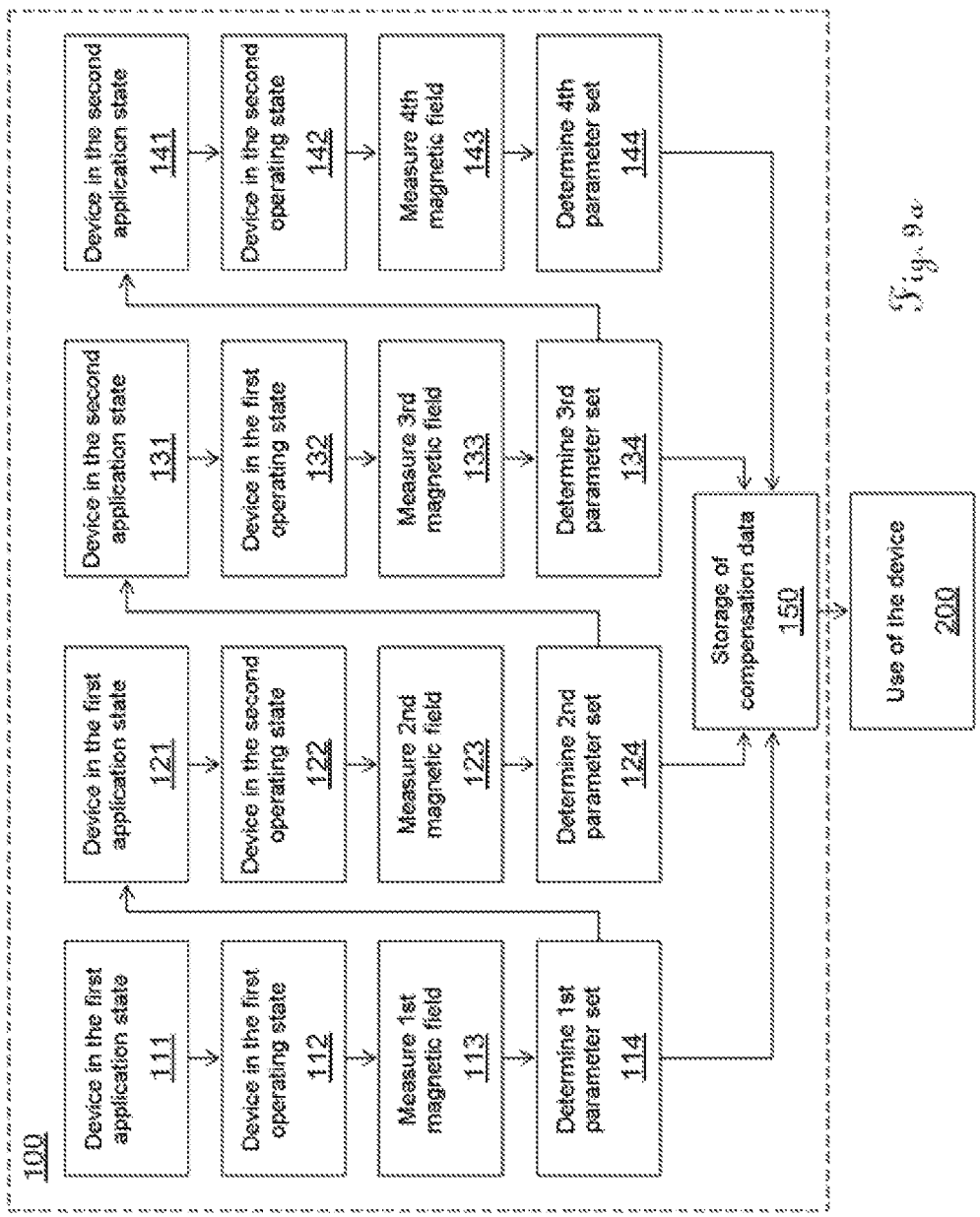
FIG. 9*a-b* flow charts to illustrate an exemplary method for initial compensation.
Figure 9B:
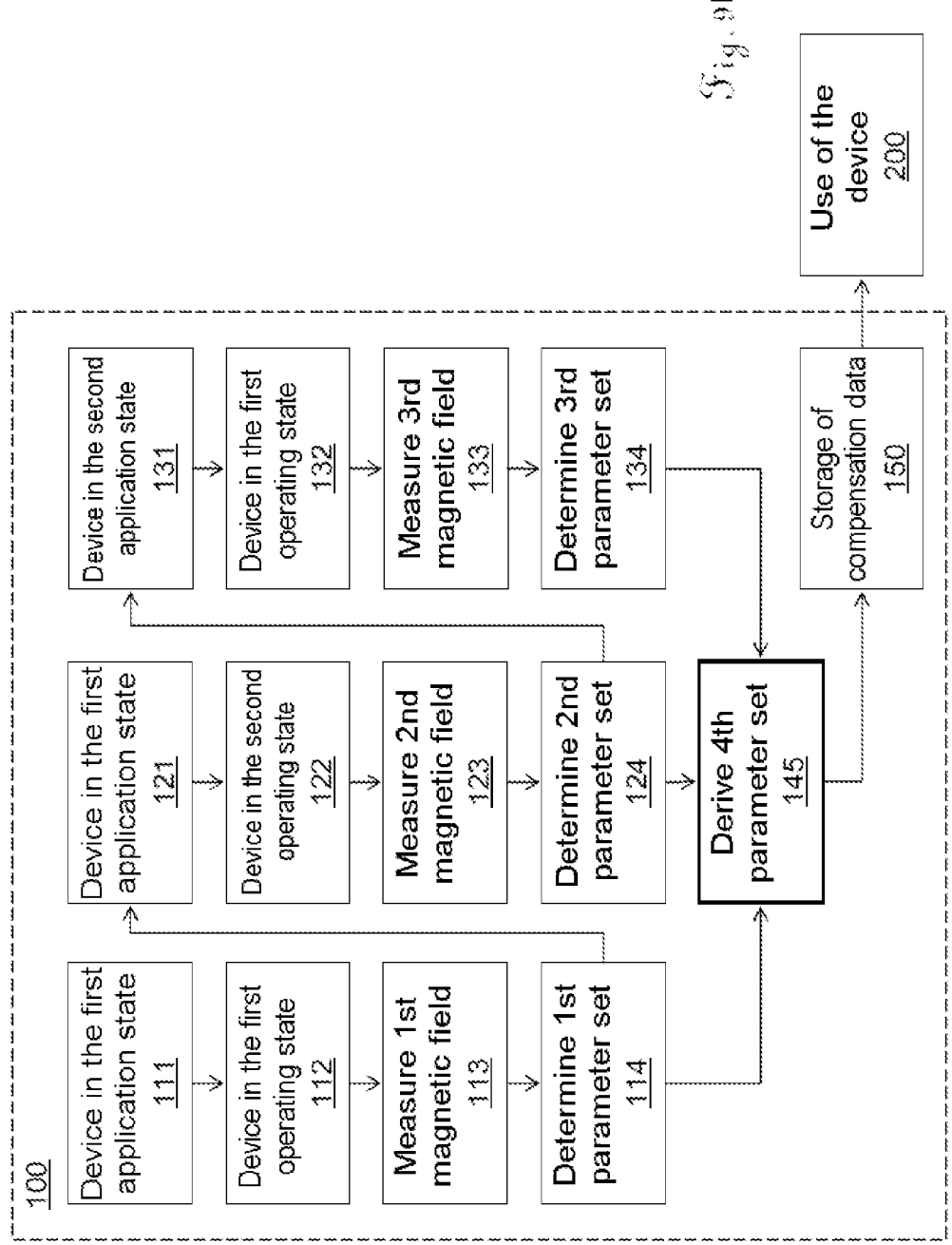

The FIGS. 9a and 9b illustrate an initial compensation of the magnetic compass for each of a plurality of application and operating states of the device. In this case, for the sake of clarity the simplest case is shown, in which the device occupies two application statuses and two operating states, i.e. a total of 2×2=4 total states. With an increasing number of possible operating and/or application states, the number of parameter sets that can be determined from existing parameter sets, for which no measurement is necessary, increases accordingly.

In FIG. 9a an initial compensation 100 is first shown, where all four necessary compensations are performed in the conventional manner. First of all, the device is located in the first application state 111 and in the first operating state 112. Thus, for example, the device is in the unmounted, handheld state (first application state 111), and an infra-red sighting device of the device is switched off (first operating state 112). In this first overall state a first magnetic field 113 is then measured by the magnetic compass and based thereon, a first parameter set is determined by a computing unit 114. This parameter set, which contains information about the first magnetic field of the first overall state, is then stored 150 in a data memory of the compensation device.

Thereafter, the device is transferred into a second operating state 122, in particular manually by a user. The application state initially remains unchanged 121. Thus, for example, the device remains in the hand-held state (unmounted), but the infrared sighting device is now switched on, which generates a device-fixed interference field. In this second overall state a second magnetic field 123 is then measured and a second parameter set is determined 124, based thereon. The latter is stored 150.

Then the device is transferred into a second application state 131, thus for example, the device is mounted on an external device that generates an external magnetic interference field. The first operating state is restored 132. In this third overall state, a third magnetic field 133 is then measured and a third parameter set is determined 134, based thereon. The latter is stored 150.

Thereupon the device is left in the second application state 141, for example, it remains mounted, and the second operating state is again restored 142. In this fourth overall state, a fourth magnetic field 143 is then measured and a fourth parameter set is determined 144, based thereon. The latter is stored 150.

After a corresponding parameter set exists for each possible overall state, the initial compensation 100 is completed and the device can be used as intended 200.

FIG. 9b shows an initial compensation 100, which can be used in a method according to the invention. As above described with reference to FIG. 9a, three overall states of the device are first established one after another (Steps 111, 112, 121, 122, 131, 132), in which a first, second, and third magnetic field are measured respectively (Steps 113, 123, 133) and the corresponding parameter sets determined (Steps 114, 124, 134) and stored 150. According to the invention, the measurement in the fourth overall state is advantageously unnecessary here. Instead, as shown above, the fourth parameter set can be derived 145 from the three known parameter sets. This corresponds to the parameter set determined from the fourth measured magnetic field in FIG. 9a, and therefore contains information about the fourth magnetic field of the fourth overall state, without this overall state having had to be established during the initial compensation 100 or the corresponding magnetic field having had to be measured. The fourth parameter set is stored 150, at which point the initial compensation 100 is completed, and the device can be used as intended 200 (in other words, for example as shown in FIG. 3).

The invention claimed is:

1. Optoelectronic measuring device, comprising:
   an electronic magnetic compass for determining an azimuthal orientation of the measuring device; and
   a compensation device associated with the magnetic compass for compensating device-fixed interference fields,
   wherein:
      the measuring device is designed to occupy at least two defined, repeatable operating states, wherein the measuring device has a different device-fixed interference field in each of the operating states;
      the compensation device has a computing unit and a compensation functionality for carrying out an initial compensation of the electronic magnetic compass in a first and a second operating state of the measuring device;
      the measuring device is designed to occupy at least two defined, repeatable application states, wherein in each of the application states the magnetic compass is exposed to a different external magnetic interference field;
      the compensation device is additionally designed to compensate for the external interference fields;
      wherein the compensation device is designed, in the context of the compensation functionality,
      by means of the magnetic compass:
         to measure a first magnetic field set in a first overall state of the measuring device, in which the measuring device occupies the first operating state and a first application state;
         to measure a second magnetic field set in a second overall state of the measuring device, in which the measuring device occupies the second operating state and the first application state; and
         to measure a third magnetic field set in a third overall state of the measuring device, in which the measuring device occupies the first operating state and a second application state; and
      by means of the processing unit:
         to determine, based on the first, second and third magnetic field set, a first, second and third parameter set respectively; and
         to derive a fourth parameter set based on the first, second and third parameter set.

2. The measuring device as claimed in claim 1, wherein the derived fourth parameter set corresponds to a parameter set that can be determined based on a fourth magnetic field set, which is measurable in a fourth overall state of the measuring device, in which the measuring device occupies the second operating state and the second application state.

3. The measuring device as claimed in claim 1, wherein the measuring device is a hand-held optoelectronic monitoring device, having:
a display unit for displaying measurement data having the azimuthal orientation; and/or
an interface for providing a signal, which comprises information about the azimuthal alignment, for an external receiver including a Geographic Information System, a military firing control device or a hand-held data processing device.

4. The measuring device as claimed in claim 1, wherein the magnetic compass has at least three device-fixed measuring sensors for measuring a magnetic field and the direction of the gravitational field.

5. The measuring device as claimed in claim 1, wherein the compensation device is designed to compensate for hard- and soft-magnetic device-fixed interference fields.

6. The measuring device as claimed in claim 1, wherein the measuring device is designed to be mounted on an external device which generates an external interference field, and is mounted on the external device in at least one of the at least two application states actual, and wherein:
the first and the second application state of the measuring device differ from each other with regard to the external interference field of the external device, and wherein the measuring device is designed:
to be mounted on different external devices which generate different external interference fields; and/or
to be mounted on an external device, which is designed to occupy at least two defined, repeatable states, wherein the external device generates a different external interference field in each of the states.

7. The measuring device as claimed in claim 1, wherein the compensation device has a detection device for detecting a current operating state and/or application state of the measuring device.

8. The measuring device as claimed in claim 7, wherein the detection device is designed to detect the current operating state and/or application state automatically.

9. The measuring device as claimed in claim 7, wherein the detection unit is designed:
to establish a data connection to the external device;
to receive data on a current state of the external device by means of the data connection; and
to determine the current application state of the measuring device based on the data about the current state of the external device.

10. The measuring device as claimed in claim 7, wherein:
the first and the second operating state of the measuring device differ from each other at least with regard to a current state of a selectable electrical system of the measuring device in the fact that the electrical system of the measuring device is switched either on or off; and
the detection unit is designed to detect a current state of the electrical system.

11. The measuring device as claimed in claim 10, wherein:
the first and the second operating state of the measuring device differ from each other in a current amplitude and/or voltage currently present in the electrical system; and the detection unit is designed to determine a current amplitude and/or voltage currently present in the electrical system.

12. The measuring device as claimed in claim 1, further comprising:
at least one hard- or soft-magnetic component, which is designed to occupy at least two different positions in or on the measuring device, wherein the first and the second operating state differ from each other in that the hard- or soft-magnetic component each have a different position.

13. The measuring device as claimed in claim 12, wherein the hard- or soft-magnetic component includes:
a mechanical switch including a toggle, rotary or sliding switch to be operated by a user; or
is a motorized movable element including an optical element that is movable as part of a zoom operation.

14. A method for compensating a magnetic compass, wherein the magnetic compass is part of a device including the optoelectronic measuring device according to claim 1, wherein the device is designed to occupy at least two defined, repeatable operating states and has a different device-fixed magnetic interference field in each of the operating states, the method comprising:
measuring a first magnetic field set using the magnetic compass under the influence of a first interference field of the device when in a first operating state;
determining a first parameter set based on the first magnetic field set;
measuring a second magnetic field set using the magnetic compass under the influence of a second interference field of the device when in a second operating state;
determining a second parameter set based on the second magnetic field set;
measuring a third magnetic field set using the magnetic compass under the influence of an external interference field and the first interference field of the device when in the first operating state;
determining a third parameter set based on the third magnetic field set; and
deriving a fourth parameter set based on the first, second and third parameter set, wherein the derived fourth parameter set corresponds to a parameter set, which can be determined based on a fourth magnetic field set, which is measurable under the influence of the external interference field and the second interference field of the device when in the second operating state.

15. The method as claimed in claim 14, wherein the external magnetic interference field is effected by a mounting of the device on an external device, and wherein the external device generates the external magnetic interference field.

16. The method as claimed in claim 14, wherein the external magnetic interference field is effected by a change of state on an external device, on which the device is mounted, wherein the external device generates the external magnetic interference field.

17. The method as claimed in claim 14, further comprising an automatic detection of the first and second operating state of the device.

18. The method as claimed in claim 17, further comprising a detection of:
a current state of an electrical system of the device; and/or
a current position of a hard- or soft-magnetic component of the device.

19. A computer program product with program code, which is stored on a machine-readable medium, for executing at least the following steps of the method as claimed in claim 14 when the program is executed on an electronic data processing unit designed as a compensation device of the optoelectronic measuring device, further comprising:

determining the first parameter set based on the first magnetic field set;

determining the second parameter set based on the second magnetic field set;

determining third parameter set based on the third magnetic field set; and deriving fourth parameter set based on the first, second and third parameter set.

* * * * *